United States Patent
Lambert et al.

(10) Patent No.: US 10,437,977 B2
(45) Date of Patent: Oct. 8, 2019

(54) SYSTEM AND METHOD FOR DIGITAL KEY SHARING FOR ACCESS CONTROL

(71) Applicant: TrustPoint Innovation Technologies, Ltd., Waterloo (CA)

(72) Inventors: Robert John Lambert, Cambridge (CA); Jay Peter Gallant, Toronto (CA); Mark Gregory Elkins, Kitchener (CA); Nevine Maurice Nassif Ebeid, Kitchener (CA)

(73) Assignee: ETAS Embedded Systems Canada Inc., Waterloo (CA)

( * ) Notice: Subject to any disclaimer, the term of this patent is extended or adjusted under 35 U.S.C. 154(b) by 239 days.

(21) Appl. No.: 15/291,179

(22) Filed: Oct. 12, 2016

(65) Prior Publication Data
US 2017/0104589 A1    Apr. 13, 2017

Related U.S. Application Data

(60) Provisional application No. 62/240,765, filed on Oct. 13, 2015, provisional application No. 62/376,034, filed on Aug. 17, 2016.

(51) Int. Cl.
| | | |
|---|---|---|
| *G06F 21/33* | (2013.01) | |
| *H04W 4/40* | (2018.01) | |
| *H04L 9/32* | (2006.01) | |
| *H04L 29/06* | (2006.01) | |
| *H04W 4/80* | (2018.01) | |
| *H04W 4/04* | (2009.01) | |
| *H04W 12/08* | (2009.01) | |

(52) U.S. Cl.
CPC .......... *G06F 21/335* (2013.01); *H04L 9/3268* (2013.01); *H04L 63/0823* (2013.01); *H04W 4/40* (2018.02); *H04W 4/80* (2018.02); *G06F 21/33* (2013.01); *G06F 2221/2103* (2013.01); *H04L 2209/84* (2013.01); *H04W 4/046* (2013.01); *H04W 12/08* (2013.01)

(58) Field of Classification Search
CPC ... H04L 67/12; H04L 63/0823; H04L 9/3268; H04L 2209/84; H04W 4/80; H04W 12/08; H04W 4/046; G06F 21/335
See application file for complete search history.

(56) References Cited

U.S. PATENT DOCUMENTS

| | | | | |
|---|---|---|---|---|
| 2004/0034776 A1* | 2/2004 | Fernando | .............. | H04L 9/0825 713/171 |
| 2013/0099892 A1* | 4/2013 | Tucker | ............... | G07C 9/00309 340/5.61 |

(Continued)

*Primary Examiner* — Chau Le
(74) *Attorney, Agent, or Firm* — Brett J. Slaney; Blake, Cassels & Graydon LLP

(57) ABSTRACT

A communication system involving an access point, a vehicle and a user is provided. The vehicle and user possess a registration code, the user possesses a public and private key pair, and the access point and vehicle possess certificates and associated private keys. The access point issues a certificate to the user associated with the user's public and private keys, and the certificate of the access point is known and trusted by the vehicle. The access point signs a message granting ownership of the vehicle to the user, and the identity of the user indicates the user's certificate. The vehicle conditionally accepts the ownership registration request of the user.

32 Claims, 13 Drawing Sheets

(56) References Cited

U.S. PATENT DOCUMENTS

| | | | |
|---|---|---|---|
| 2014/0164776 A1* | 6/2014 | Hook | H04L 9/14 |
| | | | 713/171 |
| 2014/0309870 A1* | 10/2014 | Ricci | H04W 4/21 |
| | | | 701/36 |
| 2015/0297996 A1* | 10/2015 | Konkle | A63J 25/00 |
| | | | 463/31 |
| 2017/0161973 A1* | 6/2017 | Katta | G06Q 40/08 |
| 2017/0185981 A1* | 6/2017 | Emmerson | G06Q 20/1235 |
| 2018/0009416 A1* | 1/2018 | Maiwand | G07C 9/00182 |

\* cited by examiner

SYSTEM AND METHOD FOR DIGITAL KEY SHARING FOR ACCESS CONTROL

CROSS-REFERENCE TO RELATED APPLICATIONS

This application claims priority to U.S. Provisional Application No. 62/240,765 filed on Oct. 13, 2015; and to U.S. Provisional Application No. 62/376,034 filed on Aug. 17, 2016; the contents of both applications being incorporated herein by reference.

TECHNICAL FIELD

The following relates to systems and methods for sharing digital key sharing for access control.

DESCRIPTION OF THE RELATED ART

Modern automobiles use a variety of key-based access control methods to restrict use of the vehicle to authorized persons only. These keys are normally either a physical object or a static piece of secret knowledge such as a PIN code.

If the owner wishes to share access to the vehicle, the owner would need to give a physical key or the secret knowledge to the other party. At this point the other party has complete access to the vehicle. It is difficult for the owner to enforce any restrictions on the other party once the key has been transferred. If they key is stolen or copied by the other party, the owner would need to incur expense to change the vehicle locks in order to prevent unauthorized access. Another challenge is that in many cases the owner and the other party must be co-located in order to transfer the key.

One existing key sharing mechanism includes physical keys. In this scheme the owner has a fixed number of physical keys. These keys may be mechanical keys, electronic keys or similar. To share a key with another party, the owner gives the other party one of these physical keys. The drawbacks of using physical keys include that: the key is vulnerable to theft, restrictions on the use of the key cannot be easily enforced, keys can normally be copied without undue effort, physical keys cannot be revoked without changing the vehicle door locks, and the vehicle cannot verify the identity of the person using the key.

Another existing key sharing mechanism includes using PIN or password (e.g. keypad) entry. In this scheme a physical keypad is located on the car. To gain access to the car the owner or other party enters a PIN code or other type of password to unlock the car. Some drawbacks of using PIN/password entry are that: the password is vulnerable to theft since a malicious party may be able to eavesdrop or otherwise intercept the transfer of the password value, restrictions on use of the password cannot be enforced, passwords are not normally of sufficient length or complexity to prevent brute-force attacks, changing the password may be impossible or at least very difficult, and the vehicle cannot verify the identity of the person entering the password.

Another existing key sharing mechanism is server-based key sharing. In this scheme the owner has a digital key stored on an electronic device such as a smartphone. To share a key with another party the owner transfers a new unique digital key to the other party via a key sharing server. The new digital key is also sent to the vehicle via the key sharing server. The drawbacks with a server-based key sharing scheme include that: the vehicle needs have a connection to the key sharing server to receive new digital keys (that is, if the vehicle does not have a connection, the new digital key will not be recognized as valid), and if the owner revokes a digital key, that vehicle will not receive that information until it is able to connect to the key sharing server. This leaves a possible period of time where the holder of the revoked key can gain unauthorized access to the car.

Symmetric key-based schemes may also be used for such key sharing. These symmetric key-based schemes typically work by either sharing the owner's secret with the other party, or creating a new shared secret for every access pair that is desired (e.g., owner, friend 1, friend 2, etc.). The former scheme can cause issues with the owner's key being vulnerable to theft or misuse since the actual key is being shared. The latter scheme can be difficult to scale, particularly if the number of sharing relationships increases, including both long term and temporary sharing arrangements.

It is an object of the following to address at least one of the above-noted disadvantages.

SUMMARY

In one aspect, there is provided a method of sharing permission to access vehicles, the method comprising: generating at an owner device, a sharing invitation for another party; generating a digital permission for the other party; signing the digital permission using a private key associated with the owner device; and sending the digital permission to the other party.

In an implementation, the method of sharing further comprises sending the sharing invitation to a key sharing server; and receiving from the key sharing server a digital certificate associated with the other party device; wherein the digital permission contains the identity of the other party; and wherein the digital permission is sent to the key sharing server to be forwarded to a device of the other party. In another implementation of the method of sharing, the digital permission is sent to the other party device using a short range communication channel between the devices.

In another aspect, there is provided a communication system comprising an access point, an owner device and a third party device to be granted access by the owner device; wherein the owner device and the third party device each possess certificates and associated private keys, and wherein the owner's certificate is known and trusted by the access point; wherein the owner signs a message granting permission to the third party, the identity of the third party being included in the permission to indicate the third party's certificate.

In yet another aspect, there is provided a method of enabling a third party device to access an access point on a vehicle based on a permission granted by an owner device, the method comprising: receiving at the vehicle, a notice of a valid signature on the permission and a valid identity certificate associated with the third party device; sending a cryptographic challenge to the third party device; receiving a response to the cryptographic challenge from the third party device; verifying the response and determining any restrictions imposed on the third party device by the owner device; and blocking or allowing access to the access point according to the verifying and the determined restrictions.

In yet another aspect, there is provided a method of granting access to a vehicle via an access point, the method comprising: establishing a secure connection with an owner device; sending to the owner device a cryptographic challenge; receiving, from the owner device, a response to the cryptographic challenge, wherein the response has been generated using a certificate stored during registration with the vehicle; verifying the response received from the owner device; and granting or denying access to the access point according to the verifying.

In yet another aspect, there is provided a communication system comprising a vehicle and an owner device, wherein the vehicle and owner device each store certificates and associated private keys, and wherein the certificate of the owner device is known and trusted by the vehicle.

In yet another aspect, there is provided a method of registering owners to vehicles for granting access to access points on the vehicles, the method comprising: sending to a vehicle, from an electronic device associated with an owner, a request to register the owner; receiving at the electronic device, from the vehicle, a first digital certificate associated with the vehicle; sending to the vehicle, by the electronic device, a representation of a registration code and a second digital certificate associated with the owner; when the registration code provided by the electronic device is verified by the vehicle, receiving at the electronic device, from the vehicle, a message confirming ownership, the message comprising the first and second digital certificates and having been signed by the vehicle using a private key associated with the vehicle.

In another aspect, there is provided a communication system comprising: an access point; a vehicle; and a user device; wherein the vehicle and user device have a registration code, the user device has a public and private key pair, and the access point and vehicle each have a certificate and associated private keys; wherein the access point issues a certificate to the user device associated with the user's public and private keys, and the certificate of the access point is known and trusted by the vehicle; wherein the access point is configured to sign a message granting ownership of the vehicle to the user, the identity of the user indicating the user's certificate, and the vehicle conditionally accepts an ownership registration request of the user.

In yet another aspect, there is provided a method of revoking permission to an access point, the method comprising: generating at an owner device, a permission revocation request and signing the request; sending the signed request to a key sharing server to have the key sharing server forward the revocation notice to a third party device; initiating communication with the access point to have the revocation request verified by the access point and updating a list of permissions to access a vehicle via the access point.

In yet another aspect, there is provided a communication system comprising an access point, a vehicle, an owner device, and a third party device being revoked, wherein other users may have been previously granted permission; wherein the owner device possesses a certificate and associated private key; wherein the certificate of the owner is known and trusted by the vehicle; and wherein the owner device issues a permission revocation on a permission previously granted to the third party device being revoked.

BRIEF DESCRIPTION OF THE DRAWINGS

Embodiments will now be described by way of example only with reference to the appended drawings wherein.

DETAILED DESCRIPTION

In order to address the above-noted disadvantages with current key sharing mechanisms, cryptographic operations are used to avoid the need for the vehicle to communicate with a key sharing server, thus allowing for various operations to be performed without such connectivity between the vehicle and the server.

While in the following examples, key sharing mechanisms are described for access control to vehicles, it will be appreciated that these principles equally apply to access control to any secured (e.g. locked) object, e.g., access control to buildings.

Figure 1:
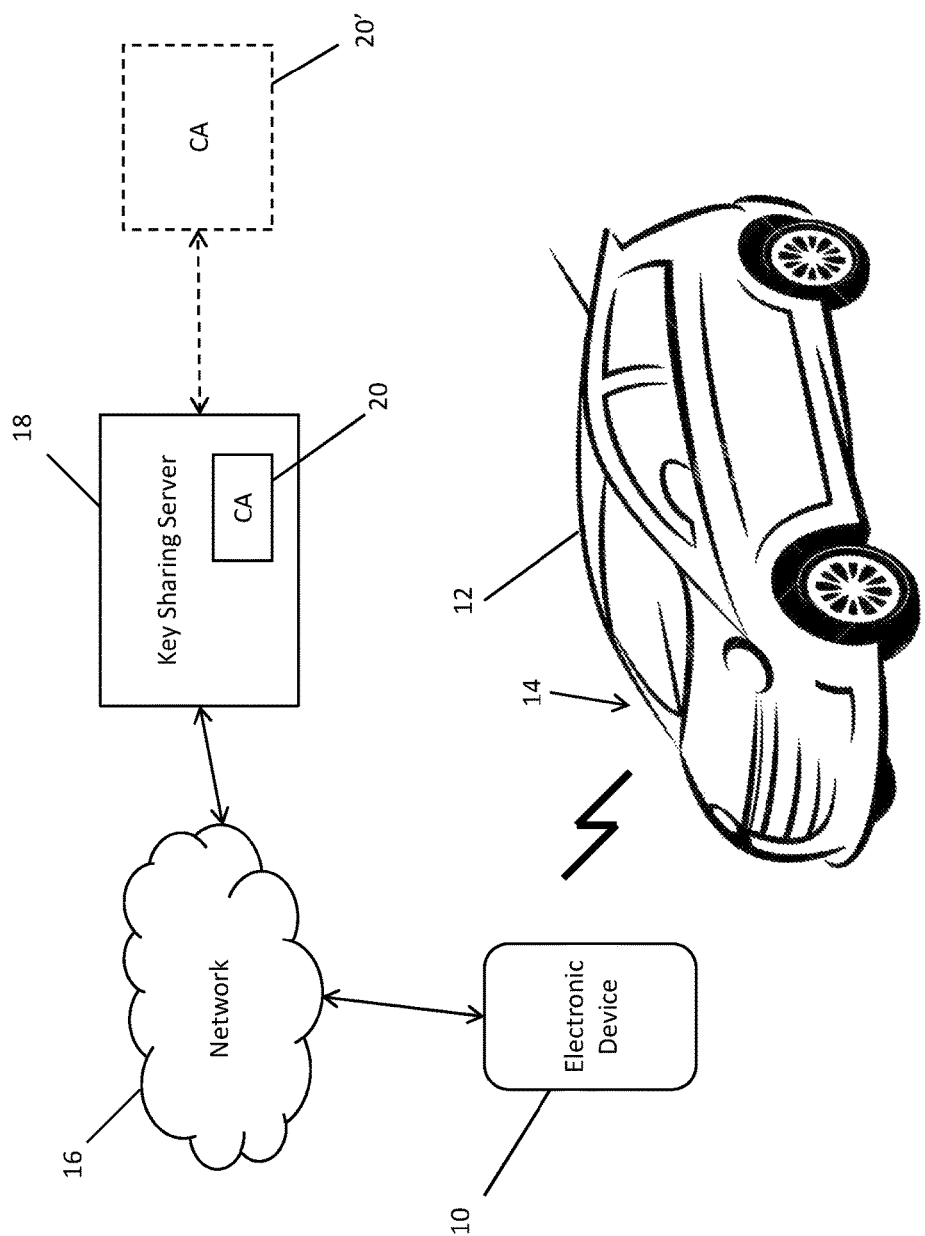
FIG. 1 is a block diagram of an example of a configuration for a system for key sharing and access control.

Turning now to the figures, FIG. 1 illustrates an example in the context of vehicle access control. An electronic device 10 such as a smartphone, tablet, smartwatch (or other wearable device), etc. is used to gain access to a vehicle 12. The vehicle 12 in this example includes an access control mechanism 14 such as a door lock. The device 10 is connectable to at least one network 16 such as a cellular or WiFi network for communicating with a key sharing server 18. The key sharing server 18 can include or otherwise provide the capabilities of a certification authority (CA) 20, or rely on an external third party CA 20'.

Figure 2:
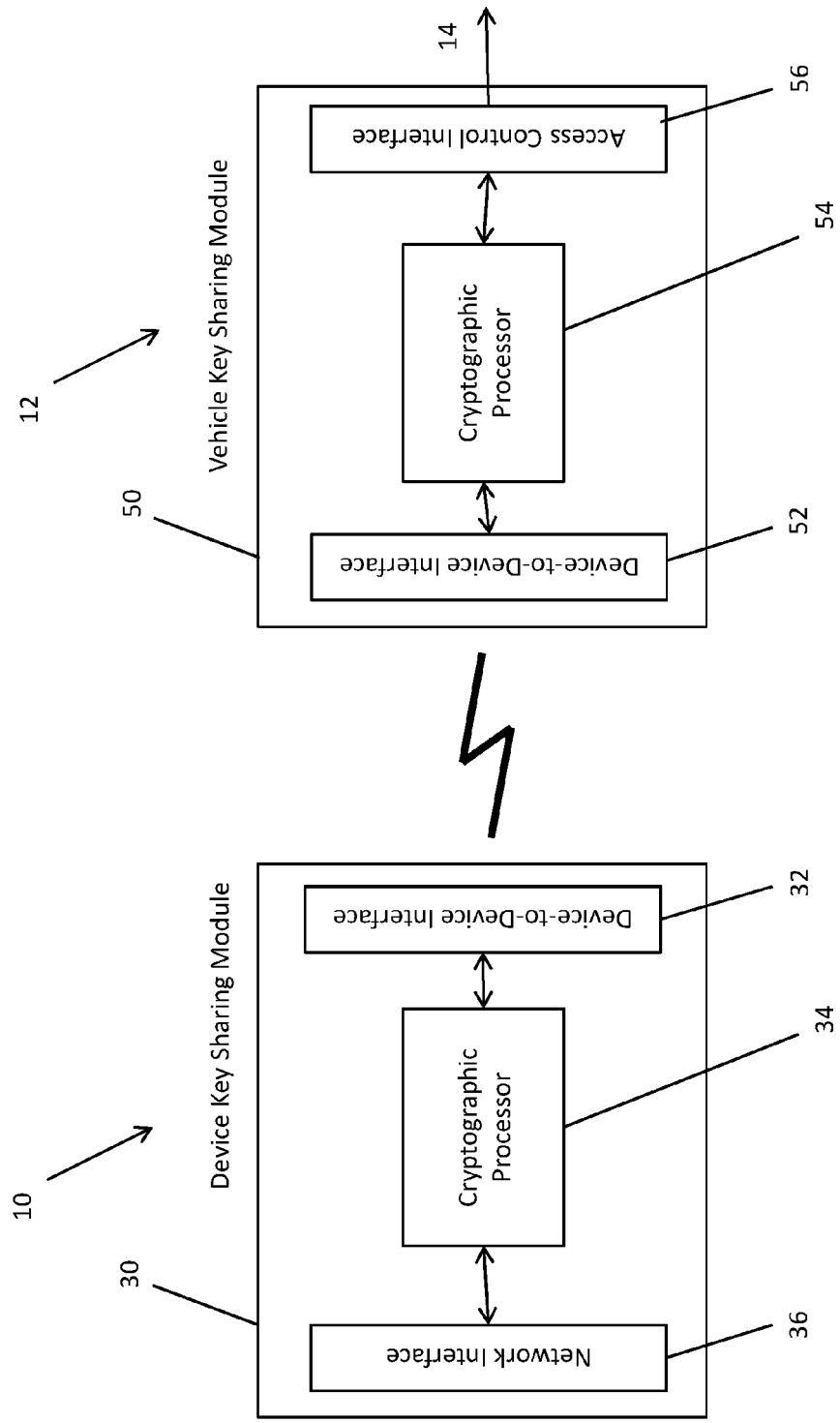
FIG. 2 is a block diagram illustrating example configurations for device and vehicle key sharing modules.

As shown in FIG. 2, the device 10 can include a device key sharing module 30 having a device-to-device interface 32 for communicating with a vehicle key sharing module 50 in the vehicle 12. The device key sharing module 30 includes a cryptographic processor 34 for performing cryptographic operations such as those exemplified below, and a network interface 36 for connecting to the network 16. The device-to-device interface 32 can be configured to utilize any suitable protocol for establishing a secure connection such as Bluetooth secure pairing, NFC pairing, Wi-Fi, etc. and communicates with a device-to-device interface 52 in the vehicle key sharing module 50. The vehicle key sharing module 50 also includes a cryptographic processor 54 for performing cryptographic operations such as those described below, and an access control interface 56 for communicating with the access control mechanism 14 to enable entry to the vehicle 12 when permissions can be verified.

Figure 3:
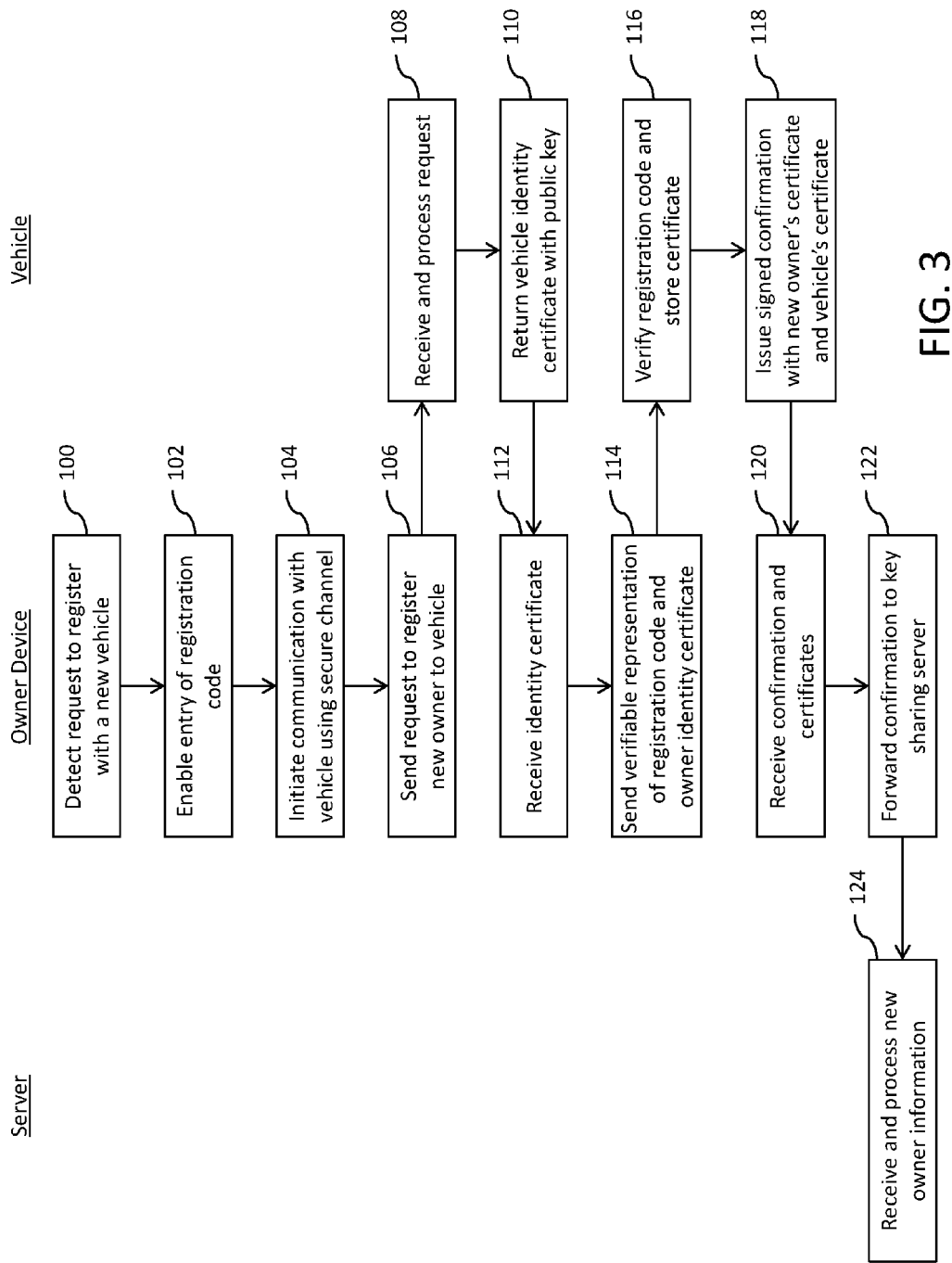
FIG. 3 is a flow chart illustrating example computer executable operations for performing owner registration.

FIG. 3 illustrates a process for enabling owner registration. The vehicle owner uses an electronic device 10, such as a smartphone, to register with the key sharing server 18. The key sharing server 18 issues a Public Key Infrastructure (PKI) certificate to establish the owner's identity using a cryptographic key pair generated by the electronic device 10. The electronic device 10 stores the key pair and the certificate for later use. The owner uses the certificate and a registration code provided by the vehicle manufacturer to register with the vehicle 12 as the valid owner. The registration process can be performed as follows.

The owner indicates to the electronic device 10 that he or she would like to register with a new vehicle 12 and the device 10 detects a request to do same at step 100. The device 10 enables the owner to enter the vehicle registration code provided by the manufacture, into the electronic device 10 at step 102. The owner then initiates communication between the device 10 and the vehicle 12 at step 104, using a secure channel (e.g., via the device-to-device interfaces 32, 52). The device sends a request to register a new owner to the vehicle 12 at step 106. The vehicle 12 receives and processes the request at step 108, and responds with its identity certificate at step 110, which includes its cryptographic public key and any other required data. The device 10 receives the identity certificate at step 112, and then sends a cryptographically verifiable representation of the registration code and the owner's identity certificate to the vehicle at step 114.

The vehicle 12 receives the verifiable representation of the registration code at step 116, and verifies that the registration code sent is valid at step 116. If so, the vehicle 12 stores the owner's certificate for future validation, removing any previously stored certificates. The vehicle 12 then issues a signed confirmation of ownership message containing the new owner's certificate, and the vehicle's certificate, signed by the vehicle's private key to the owner's device 10 at step 118. The owner's device 10 receives this confirmation at step 120, and may then forward this message to the key sharing server 18 at step 122, to track the car-owner relationship. The confirmation is received by the key sharing server 18 at step 124 and may be processed to determine new owner information.

It may be noted that no communication was required between the vehicle 12 and the key sharing server 18 in order to register the owner. After a first successful use, the vehicle 12 may disable the registration code so that even if the registration code is lost, no other user can register with the vehicle 12.

Figure 4:
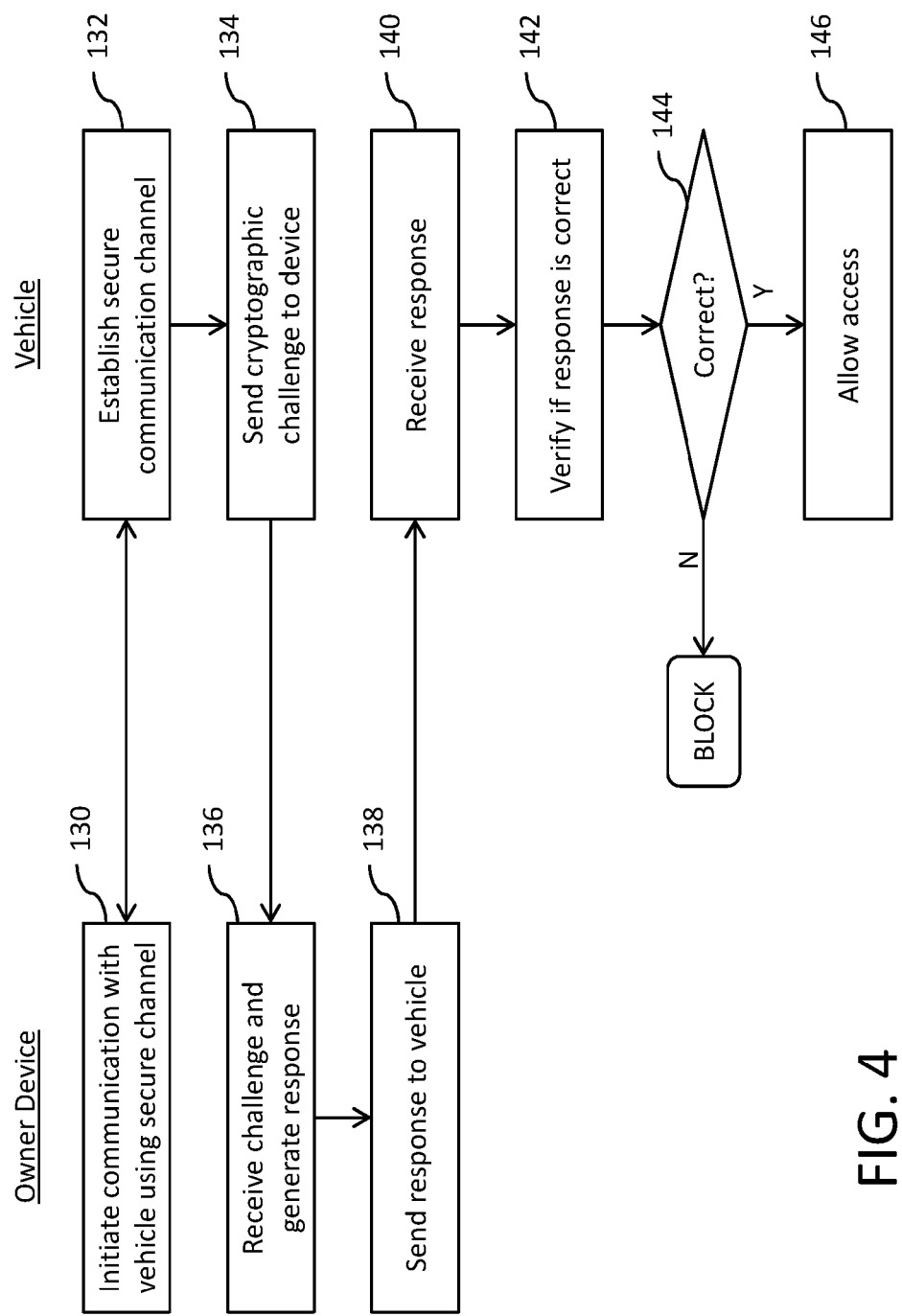
FIG. 4 is a flow chart illustrating example computer executable operations for executing owner access.

FIG. 4 illustrates a process for enabling owner access (e.g., to open the vehicle door), subsequent to be registered. To begin, the owner initiates communication between the electronic device 10 and the vehicle 12 using a secure channel at steps 130 and 132. The vehicle is then able to present the electronic device 10 with a cryptographic challenge at step 134, which is received by the device 10. The device 10 uses the owner's cryptographic private key, which is associated with the certificate stored in the registration process, to calculate the response to the challenge at step 136. The device 10 sends the generated response to the vehicle 12 at step 138. It can be appreciated that this response could be a signature on the challenge data, a key agreement computation (e.g. Diffie-Hellman), or other suitable cryptographic challenge/response technique.

The vehicle 12 receives the response at step 140, and verifies that the response is correct at step 142. If it is determined at step 144 that the response is correct, the vehicle 12 will allow access at step 146.

As an optional variation, if the vehicle 12 and the owner's device 10 are both GPS capable, the vehicle 12 or the owner, or both, could contribute their GPS location as a component of the cryptographic challenge, which would still also include a random component chosen by the vehicle 12. These location values are to be communicated between the owner device 10 and the vehicle 12, and if the vehicle 12 determines that the owner is too far away from the vehicle's position, the vehicle 12 can be configured to fail to allow access, deeming that it may be the subject of a relay attack, where the owner is being tricked into performing the owner access process in some locale too distant from the owned vehicle.

Similarly, it the owner's device 10 determines that the vehicle 12 is not in fact local, the owner's device 10 can quit the owner access process, sensing an attack. The owner's device 10 incorporates the location given by his/her vehicle as part of the cryptographic challenge, so a relaying attacker may not change this without making the response fail.

The owner may wish to share their digital access key with another party (e.g. a family member, friend or colleague). In order to share keys with another party, the owner can execute the process shown in FIG. 5.

To share a key, the owner uses their electronic device 10 to generate a sharing invitation for the other party at step 160. The owner may authenticate this invitation with a private key. The device 10 then sends the sharing invitation to the key sharing server 18 at step 162, which is received at step 164. The key sharing server 18 responds with the identity certificate of the other party to enable it to be provided to the vehicle 12 at step 166. After receiving the identity certificate of the other party, the owner can use their device 10 to set any desired restrictions on the use of the vehicle 12 by the other party at step 168. Restrictions can include, for example, time of day, specific calendar days or date ranges, and geographic locations or regions.

The device 10 then creates a digital permission at step 170 containing the identity of the other party (as defined by his or her identity certificate), and the restrictions set by the owner. This digital permission is cryptographically signed at step 172 using the owner's cryptographic private key. The device 10 sends the digital permission to the key sharing server 18 at step 174. The key sharing server 18 receives the digital permission at step 176, and forwards the digital permission to the electronic device of the other party at step 178, which is received by the other party at step 180. Optionally, the key sharing server 18 may also cryptographically sign the permission prior to forwarding it to the other party device.

Figure 6:
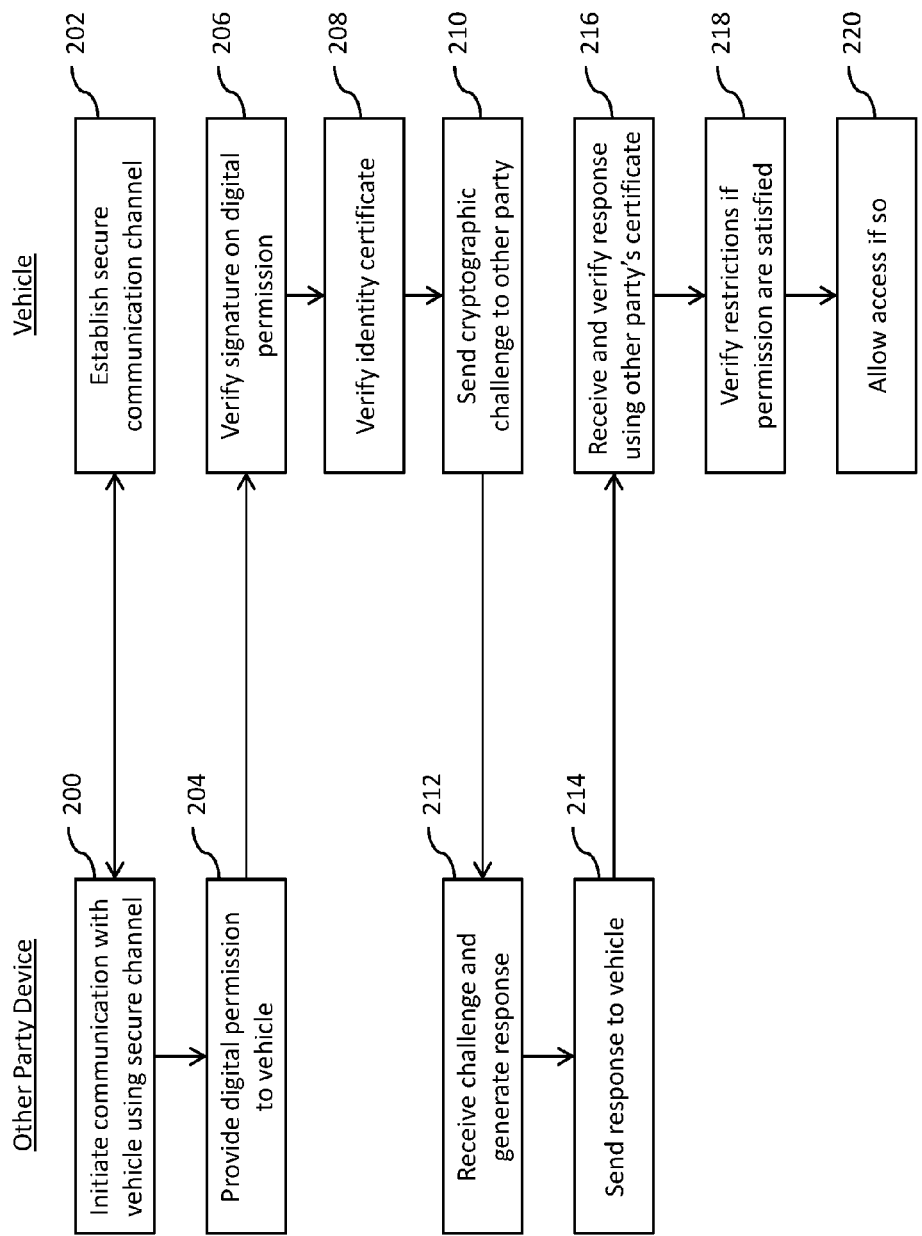
FIG. 6 is a flow chart illustrating example computer executable operations for enabling shared access.

As shown in FIG. 6, once the digital permission is received, the other party can execute the following process to access the vehicle 12. The other party will initiate communication between their electronic device and the vehicle 12 at steps 200 and 202 using a secure channel (e.g., similar to device 10 shown in FIG. 1) and provide the digital permission to the vehicle 12 for verification at step 204. The vehicle 12 cryptographically verifies the signature on the digital permission as belonging to the owner (and to the signing server 18 if applicable) using stored identity certificates at step 206. The vehicle will also verify that the identity certificate presented by the owner device matches the identity supplied in the digital permission at step 208.

If the signature and certificate supplied are valid, the vehicle 12 presents a cryptographic challenge to the other party's device at step 210. The other party's device uses the other party's cryptographic private key to complete the challenge at step 212, and the device sends the response to the vehicle 12 at step 214. A similar cryptographic primitive as that described above can be used, such as signature or key-agreement. The vehicle 12 verifies that the response is correct at step 216, and also that the restrictions in the digital permission are satisfied at step 218. If so, the vehicle 12 will allow access at step 220. It may be noted that, as above, no communication was required between the vehicle 12 and the key sharing server 18 in order to share the key.

In an optional variation, the system described herein can be modified to require that the key sharing server 18 sign the digital permissions periodically (e.g., every 24 hours or other suitable time period). The other party's device would then be required to connect to the key sharing server 18 every so often to obtain a freshly signed version of the permission. This would give the owner a guarantee that a revoked permission would be enforced within that time period (e.g. every 24 hours), even if the other party disconnected their phone from the key sharing server 18 and the owner did not have access to the vehicle 12. This scheme would require that the vehicle 12 module has access to a clock of some sort to enforce the requirement. Also, there is a chance (though unlikely) that the other party might be legitimately disconnected from the key sharing server 18 for more than 24 hours.

Figure 7:
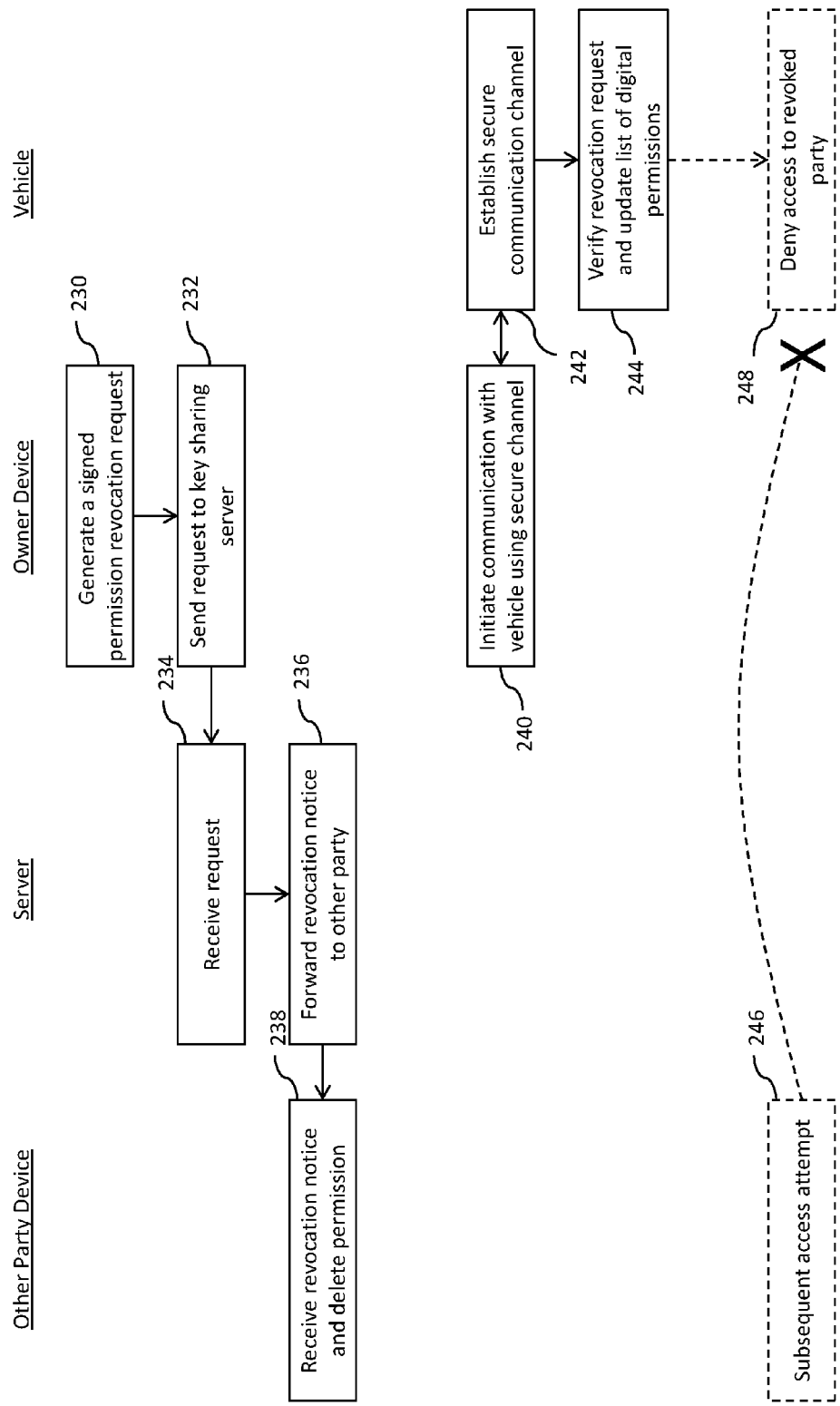
FIG. 7 is a flow chart illustrating example computer executable operations for performing permission revocation.

Should the owner at any time wish to withdraw a previously granted digital permission for another party to access the vehicle 12 the process shown in FIG. 7 can be used. The owner uses their electronic device 10 to generate a signed permission revocation request at step 230, and this request is sent to the key sharing server 18 at step 232. After receiving the request at step 234, the key sharing server 18 forwards a revocation notification to the electronic device of the other party at step 236, which is received by the other party at step 238. The device of the other party is then instructed to delete the revoked digital permission. For example, the other party can be made to use an application provided by a service associated with the key sharing server, manufacturer, etc. which would include a mechanism to enforce deletion of the permissions.

The next time the owner unlocks the vehicle 12 using their electronic device 10 at steps 240 and 242, the vehicle 12 verifies the signature on the permission revocation request at step 242, and if successful, the list of revoked digital permissions stored in the vehicle 12 is updated to prevent revoked third parties from accessing the vehicle 12 using the revoked digital permission in a subsequent attempt at steps 246 and 248.

As an alternative to the revocation notification, the key sharing server 18 can be configured to broadcast to all users with a currently valid permission, to help propagation to the vehicle 12. In that case, updating the list of digital permissions would apply to any user with a new revocation list. To prevent any privacy issues regarding a user's revocation, the list of revoked permissions could be encrypted to the vehicle. It may again be noted that no communication was required between the vehicle 12 and the key sharing server 18 in order to perform this revocation.

Figure 8:
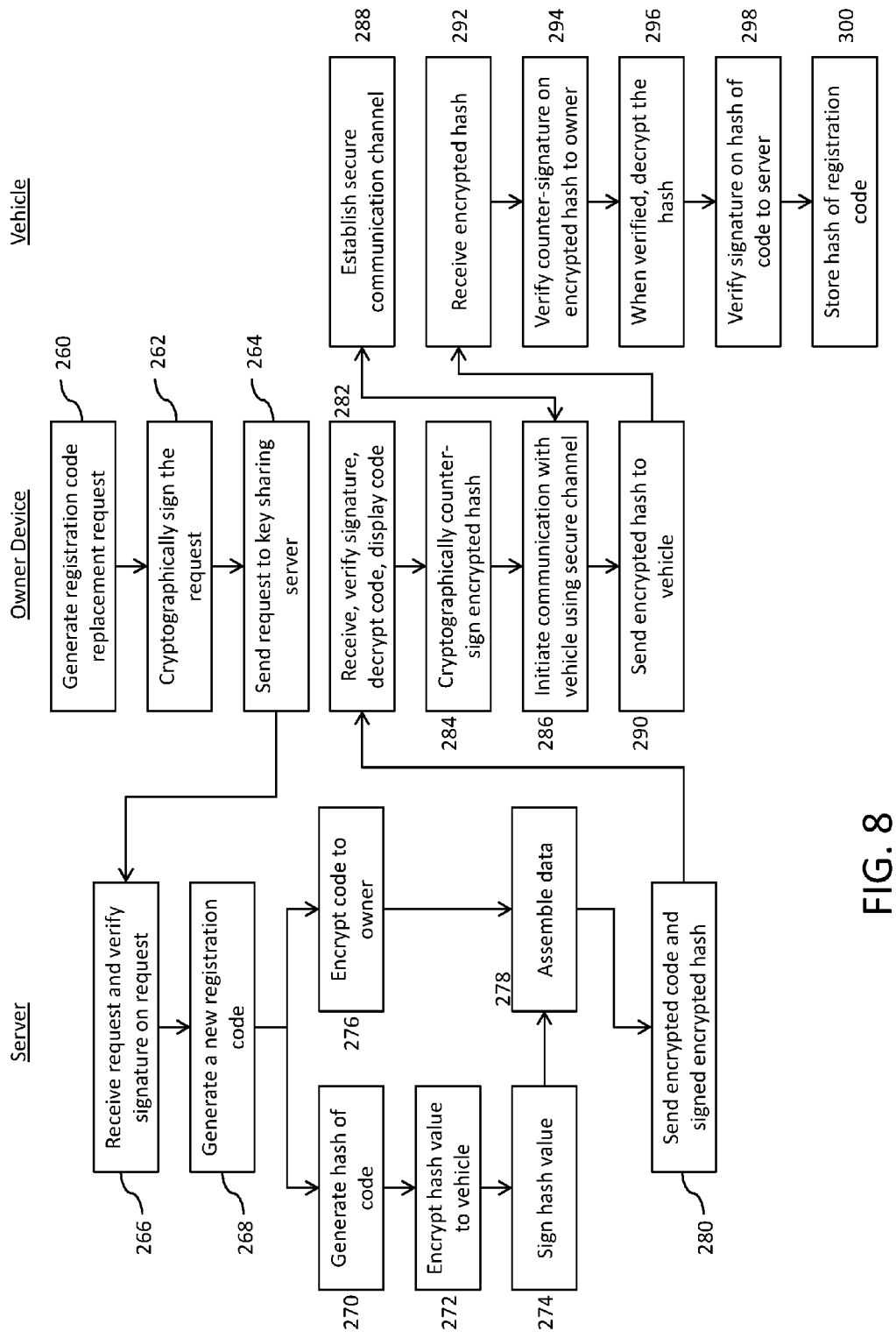
FIG. 8 is a flow chart illustrating example computer executable operations for performing registration code replacement.

In the situation where the owner has forgotten the registration code or wishes to change it, the process shown in FIG. 8 can be executed. As shown in FIG. 8, the owner can use their electronic device 10 to generate a registration code replacement request at step 260. The device 10 uses the owner's cryptographic private key to cryptographically sign the request at step 262, and the device 10 forwards the request to the key sharing server 18 at step 264. The key sharing server 18 receives the request and verifies the signature on the request at step 266. If the signature is valid and belongs to the owner, the key sharing server 18 generates a new registration code at step 268.

The key sharing server 18 then encrypts the new registration code at step 276 using the owner's cryptographic public key and signs it with the key sharing server's public key. The key sharing server 18 also generates a secure hash of the registration code at step 270. The secure hash value is then encrypted at step 272 using the cryptographic public key of the vehicle, and the encrypted hash value (or just the hash value itself) is cryptographically signed at step 274 using the cryptographic private key of the server 18. Since this can be considered a very sensitive operation, the key sharing server 18 may require the involvement of a human operator for this operation.

The key sharing server 18 assembles the data at step 278 and sends the encrypted registration code and the signed (and perhaps encrypted) hash of the registration code to the device 10 at step 280. The device 10 receives the data and verifies the signature on the hash as belonging to the key sharing server 18, decrypts the new registration code and displays the code to the owner at step 282. The new code can be displayed only once and never stored on the device 10 to ensure it cannot be reused.

The device 10 then cryptographically counter-signs the encrypted hash of the registration code at step 284 using the owner's cryptographic private key. The owner initiates communication between their electronic device 10 and the vehicle 12 at steps 286 and 288, and the device 10 sends the encrypted hash of the registration code to the vehicle 12 at step 290. The vehicle 12 receives the encrypted hash at step 292 and verifies the counter-signature on the encrypted hash of the registration code as belonging to the owner at step 294. The vehicle 12 would also have been provisioned with the registration code when it was commissioned with the public key or certificate of the key sharing server. If the counter-signed value is verified, the vehicle 12 can decrypt the hash of the registration code at step 296. The vehicle 12 also verifies the signature on the hash of the registration code as belonging to the key sharing server 18 at step 298. If so, the vehicle 12 stores the hash of the registration code for verifying future owner registration requests at step 300.

Figure 9:
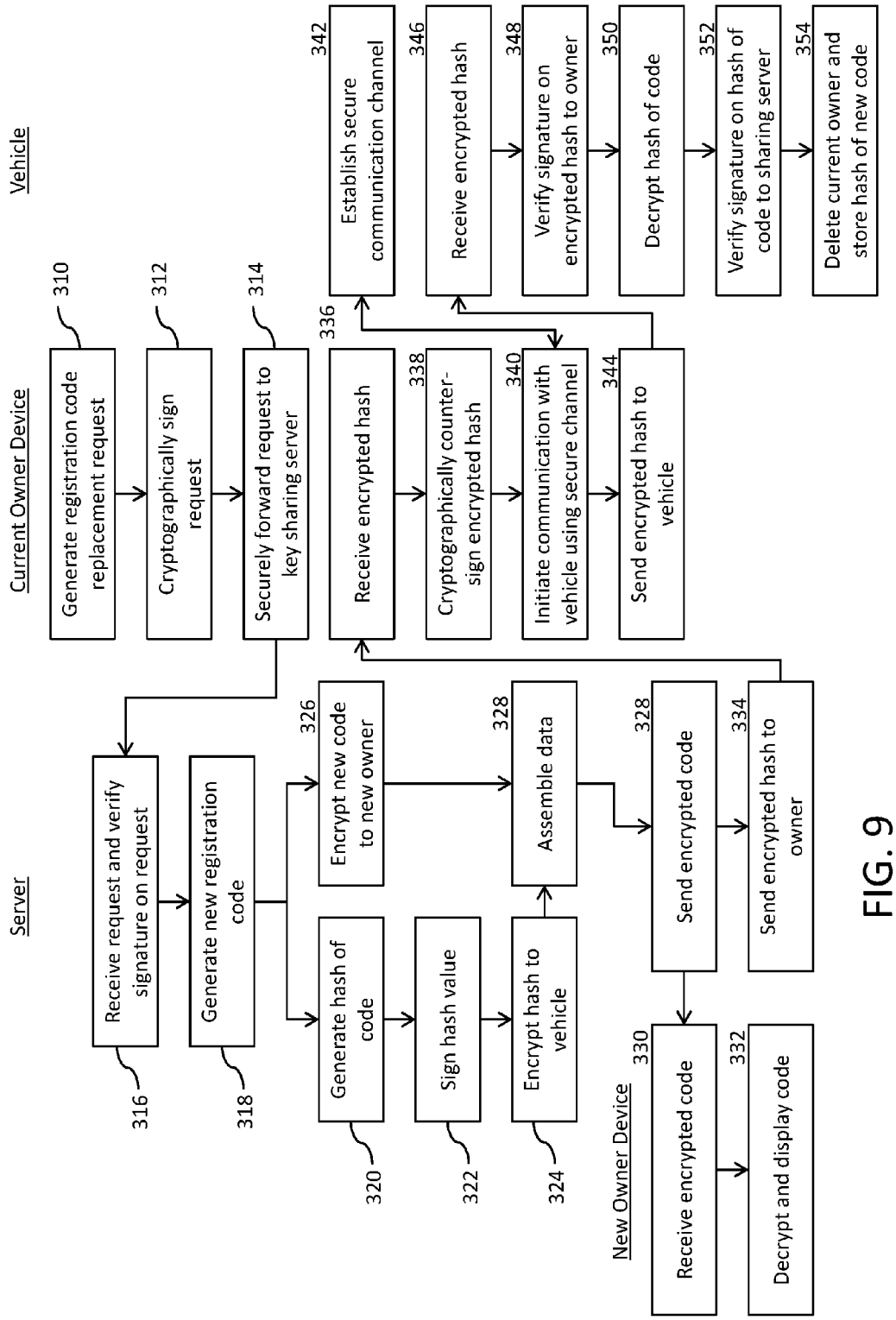
FIG. 9 is a flow chart illustrating example computer executable operations for performing an ownership change.

In order to transfer ownership of the vehicle 12 from a current owner, to a new owner, the process shown in FIG. 9 can be used. The current owner uses their electronic device 10 to generate a registration code replacement request including the identity of the new owner at step 310. The device 10 then uses the current owner's cryptographic private key to cryptographically sign the request at step 312. The device 10 securely forwards the request to the key sharing server 18 at step 314.

After receiving the request at step 316, the key sharing server 18 verifies the signature on the request and, if the signature is valid and belongs to the current owner, the key sharing server 18 generates a new registration code at step 318. Since this can be considered a very sensitive operation, the key sharing server 18 may require the involvement of a human operator for this operation.

The key sharing server 18 encrypts the new registration code using the new owner's cryptographic public key at step 326. The key sharing server 18 also separately generates a secure hash of the registration code at step 320, cryptographically signs that value (or an encrypted version of the hash using the cryptographic public key of the vehicle) using the cryptographic private key of the server 18 at step 322 and encrypts the hash to the vehicle at step 324. The key sharing server 18 then assembles the data at step 328 to enable it to send the encrypted registration code and the signed version of the hash to the new owner's electronic device at step 328. The new owner's device receives the encrypted code at step 330 and verifies the signature of the hash, decrypts the new registration code and displays the code to the new owner at step 332. The new code can be configured to be displayed only once and never stored on the device to ensure it cannot be reused. The key sharing server 18 sends the encrypted hash of the registration code to the current owner's electronic device at step 334. The current owner's device receives the code at step 336 and then cryptographically counter-signs the encrypted hash of the registration code using the current owner's cryptographic private key at step 338. The current owner then initiates communication between their electronic device 10 and the vehicle 12 at steps 340 and 342, and sends the encrypted hash, signed version of the hash (possibly also encrypted) of the registration code, and the counter-signed version of the hash to the vehicle 12 at step 344.

The vehicle 12 receives the data at step 346 and verifies the counter-signature on the encrypted hash of the registration code as belonging to the current owner at step 348. If so, the vehicle 12 decrypts the hash of the registration code at step 350. The vehicle 12 also verifies the original signature on the hash of the registration code as belonging to the key sharing server 18 at step 352. If so, the vehicle 12 deletes the certificate of the current owner from its memory and stores the hash of the registration code for verifying future owner registration requests at step 354.

At this point the new owner will be able to register with the vehicle 12 using the new registration code, and the current owner will no longer have access to the vehicle 12.

Figure 10:
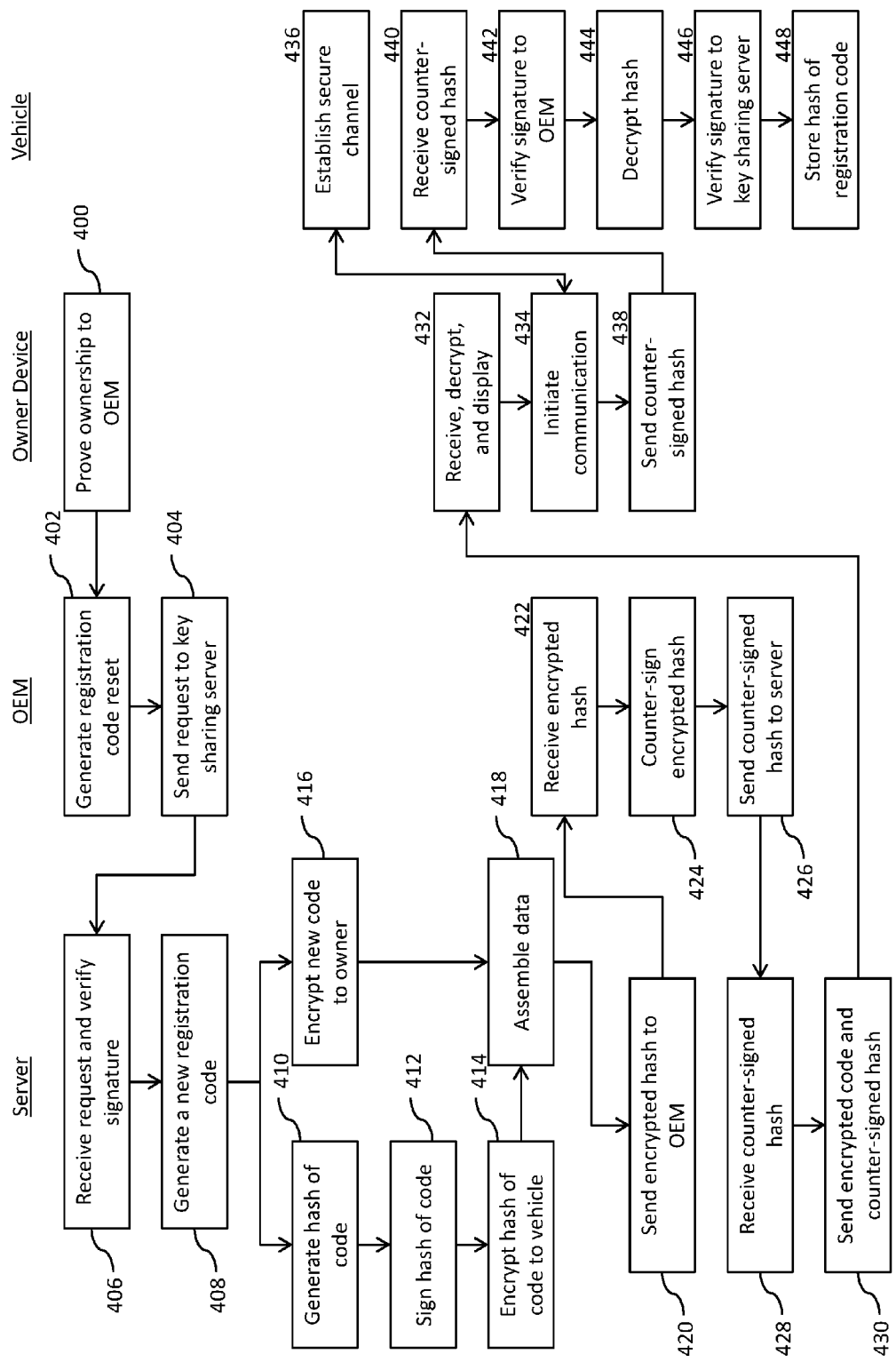
FIG. 10 is a flow chart illustrating example computer executable operations for performing a registration code reset.

In the event that the owner forgets or otherwise loses access to the registration code for the vehicle 12 and is unable to follow the process for replacing the registration code described above, (perhaps the owner's electronic device has been lost or stolen) the process shown in FIG. 10 can be used to reset the registration code to a new value.

The owner presents himself or herself to the vehicle OEM and satisfactorily prove themselves as the owner of the vehicle 12 at step 400. The OEM generates a registration code reset request at step 402 and sends the request to the key sharing server 18 at step 404, including the identity of the vehicle 12. The key sharing server 18 verifies the signature on the request at step 406 and, if the signature is valid and belongs to the OEM, the key sharing server 18 generates a new registration code at step 408.

The key sharing server 18 encrypts the new registration code using owner's cryptographic public key at step 416. The key sharing server 18 also separately generates a secure hash of the registration code, may encrypt the secure hash using the cryptographic public key of the vehicle 12 at step 412, and cryptographically sign the secure hash or encrypted secure hash value using the cryptographic private key of the server 18 at step 414.

The key sharing server 18 assembles the data at step 418 to enable it to send the encrypted hash of the registration code, and the signed version of the hash to the OEM at step 420. The OEM receives the encrypted hash at step 422 and cryptographically counter-signs the encrypted hash of the registration code using the OEM's cryptographic private key at step 424, and sends the counter-signed encrypted hash of the registration code to the key sharing server 18 at step 426, which is received at step 428.

The key sharing server 18 then sends the encrypted registration code and the counter-signed encrypted hash of the registration code to the owner's electronic device 10 at step 430. The device 10 receives, verifies the signature, decrypts the new registration code and displays the code to the owner at step 432. The new code can be displayed only once and never stored on the device 10 as discussed above.

The owner may then initiate communication between their electronic device 10 and the vehicle 12 at steps 434 and 436, and send the counter-signed encrypted hash of the registration code to the vehicle 12 at step 438, which is received at step 440. The vehicle 12 verifies the counter-signature on the encrypted hash of the registration code as belonging to the OEM using the OEM's identity certificate embedded in the vehicle at step 442. If so, the vehicle 12 decrypts the hash of the registration code at step 444. The vehicle verifies the signature on the hash of the registration code as belonging to the key sharing server at step 446. If so, the vehicle 12 stores the hash of the registration code for verifying future owner registration requests at step 448.

Figure 5:
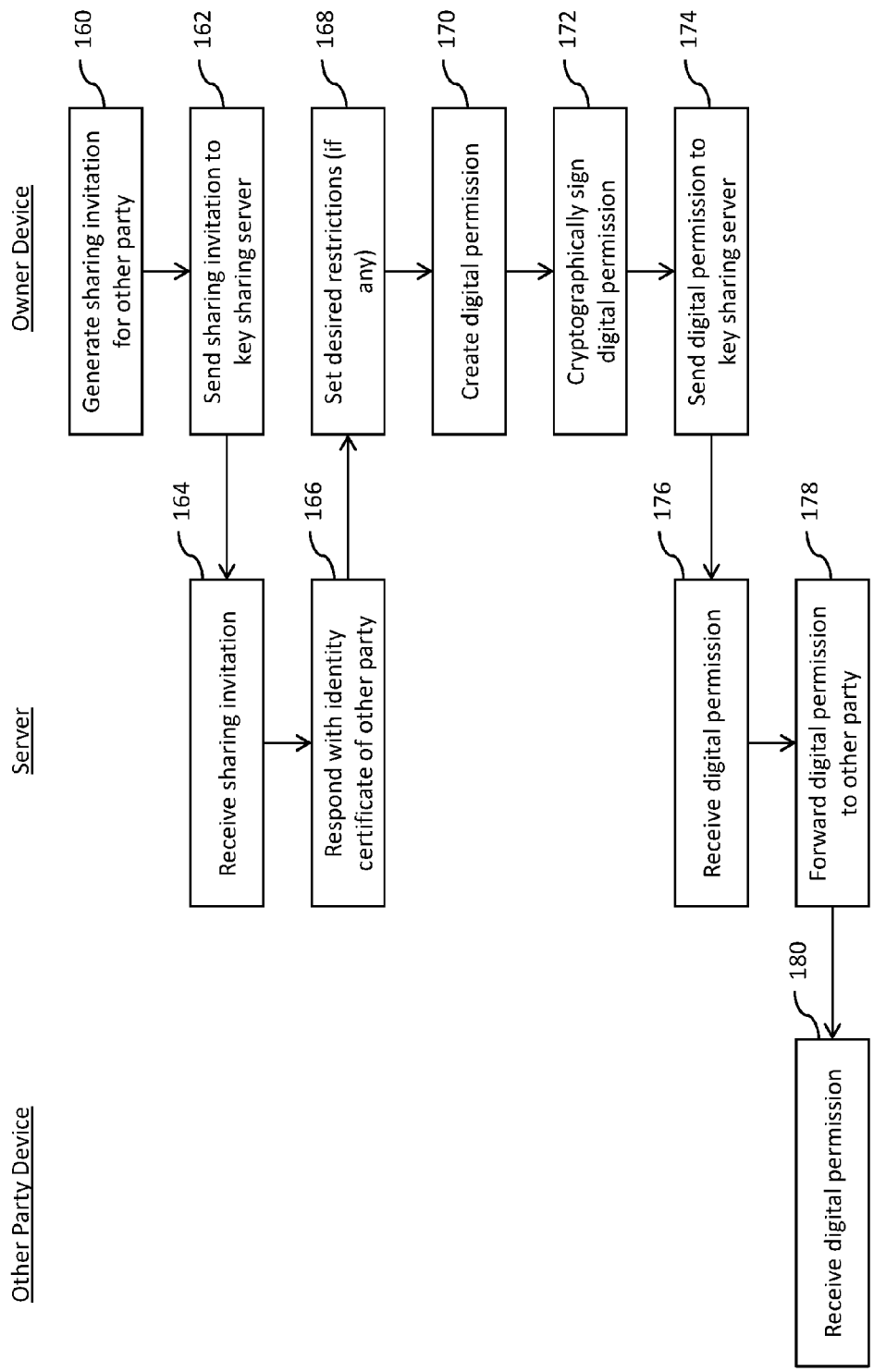
FIG. 5 is a flow chart illustrating example computer executable operations for key sharing.
Figure 11:
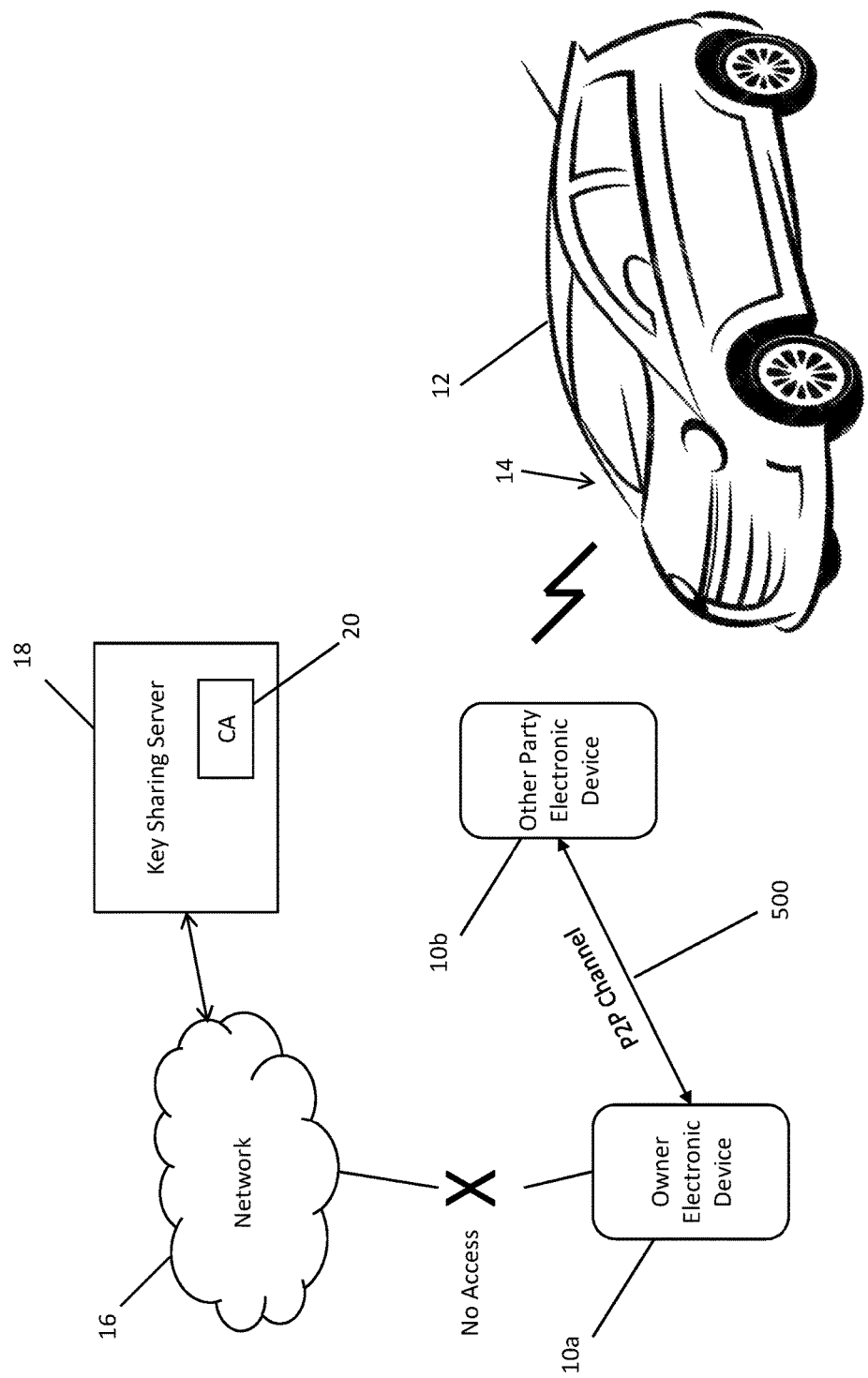
FIG. 11 is a block diagram of an example of a configuration for a system for key sharing and access control in a peer-to-peer (P2P) scenario.

In the example shown in FIGS. 1 and 5, the owner shares their digital access key with another party via the key sharing server 18. However, there may be scenarios in which the key sharing server 18 is not reachable by the owner device 10a, as shown in FIG. 11 (e.g., when a device 10 goes out-of-coverage). In such a situation, the device key sharing module 30 can also be configured to utilize a peer-to-peer (P2P) key sharing mode such that the digital access key can still be shared with another party, namely the other party device 10b, despite not having access to the network 16 and in turn the key sharing server 18. The P2P configuration can be enabled by a P2P channel 500 that exists between the two devices 10a, 10b, e.g., an NFC, BLUETOOTH, Wi-Fi, infrared, or other short-range and direct communication channel. It can be appreciated that the P2P channel 500 may be established using any available communication link, including sending permissions over email, via other server-based messaging systems, or a manual transfer using a physical medium such as an SD card.

Figure 12:
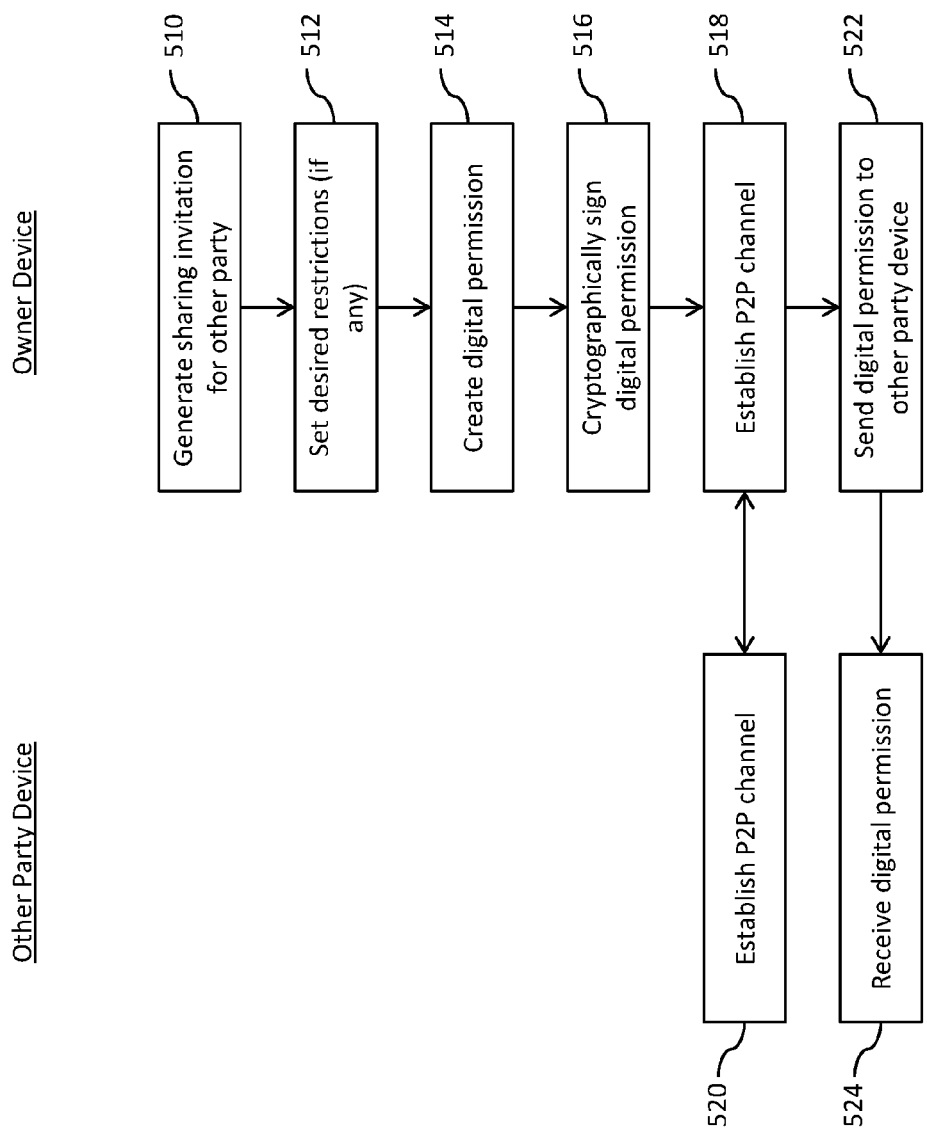
FIG. 12 is a flow chart illustrating example computer executable operations for key sharing in a P2P scenario.

The P2P sharing mode can be implemented in a manner similar to that shown in FIG. 5, without involving the key sharing server 18, at least at the outset. Such an example is shown in FIG. 12. In FIG. 12, the owner uses their electronic device 10a to generate a sharing invitation for the other party at step 510. The owner may authenticate this invitation with a private key. Instead of sending the sharing invitation to the key sharing server 18 to obtain an identity certificate for the other party, the device 10a can use its own certificate or some other credential to provide to the other party device 10b without involving the key sharing server 18. The owner can use their device 10a to set any desired restrictions on the use of the vehicle 12 by the other party device 10b at step 512. Restrictions can include, for example, time of day, specific calendar days or date ranges, and geographic locations or regions. In a P2P scenario, the device 10a may also be further restricted by a policy, e.g., to ensure that the signed credential is only valid for a certain amount of time without being subsequently validated by the key sharing server 18. For example, the owner device 10a may later come back into coverage and send an update to the key sharing server 18 with a notification of the P2P sharing session. The key sharing server 18 can attempt to communicate with the other party device 10b or otherwise record this sharing session for record keeping purposes.

The device 10a creates a digital permission containing the credential being shared by the owner, and the restrictions set by the owner at step 514. This digital permission is cryptographically signed at step 516 using the owner's cryptographic private key to enable the vehicle to authenticate the other party's permission. The device 10a establishes a P2P channel 500 with the other party device 10b at steps 518 and 520, and sends the digital permission to the other party device 10b at step 522, e.g., using an NFC "tap" or BLUETOOTH communication, etc.; which is received at step 524 The other party device 10b may then use the digital permission to access the vehicle 12, e.g., similar to the process shown in FIG. 6.

It can be appreciated that the other party device 10b may or may not have a key sharing application installed on their device 10b. For example, the owner may wish to give temporary (and even one-time) access to a valet or parking attendant that has not previously installed the application. In such scenarios, the device key sharing module 30 can be configured to enable the signed digital permission to be stored in memory on the other device 10b in a way that enables the short range interface on the other device 10b to access the permission in order to present that permission to the vehicle 12. The other device 10b may, however, already have a valid application stored, which can manage the operations described herein for the other device 10b.

Figure 13:
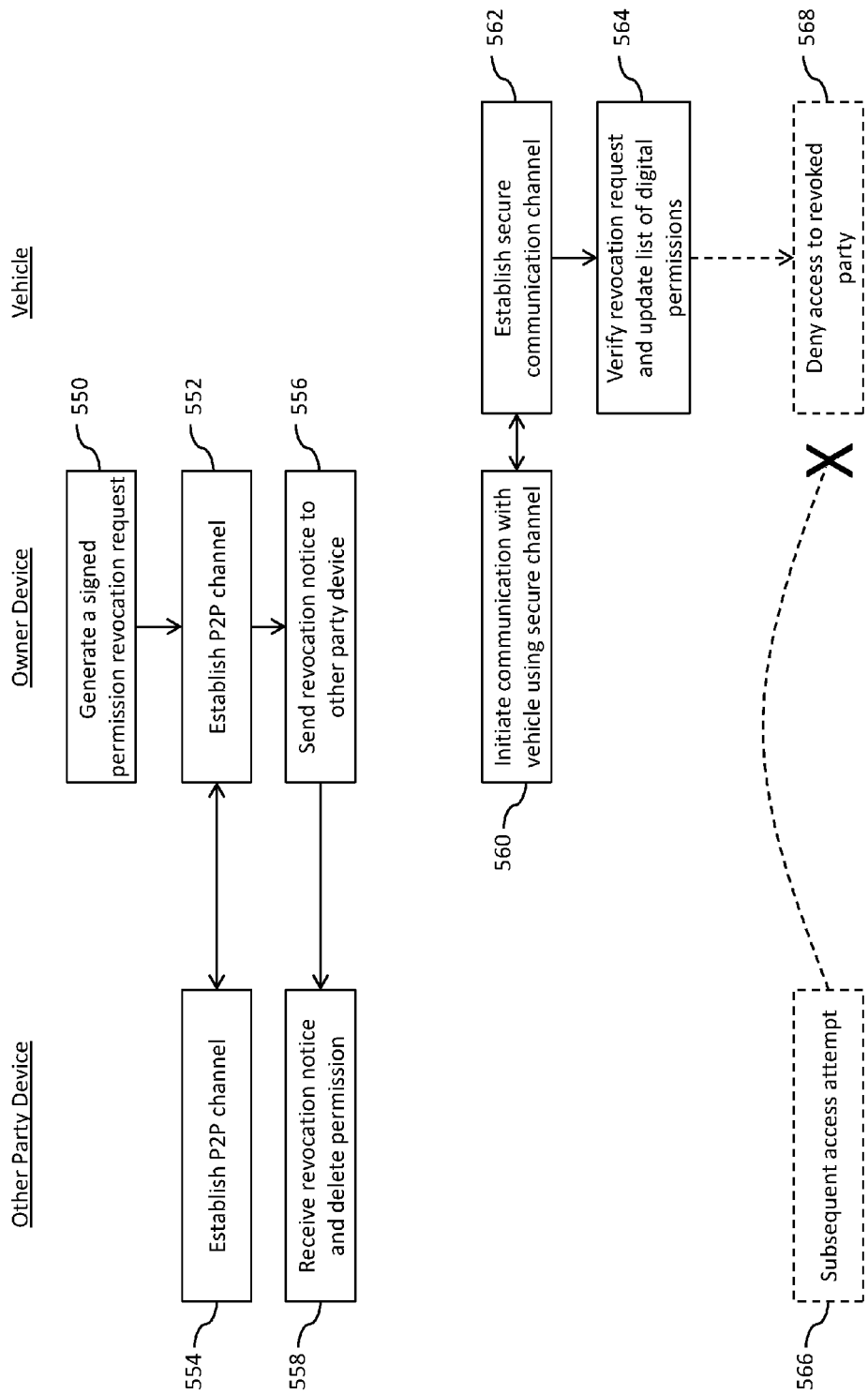
FIG. 13 is a flow chart illustrating example computer executable operations for performing permission revocation in a P2P scenario.

As shown in FIG. 13, the P2P scenario can also enable a key revocation process, similar to FIG. 7, without involving the key sharing server 18. Similar to FIG. 7, the owner device 10a generates a signed permission revocation request at step 550, establishes a P2P channel (e.g., by pairing) with the other device 10b at steps 552 and 554, in order to enable the owner device 10a to send a revocation notice to the other party device directly at steps 556 and 558. Subsequently, the owner device 10a can initiate communication with the vehicle at steps 560 and 562 as explained above, in order to enable the vehicle 12 to verify the revocation request and to update its list of digital permissions at step 564. Consequently, access attempts at step 566 would be blocked at step 568 as described above. The P2P revocation can enable an owner to retract a previous P2P key share, e.g., for a valet, thus providing additional assurance that the digital access key can no longer be used. However, it can be appreciated that subsequent communications with the key sharing server 18 can also be used to confirm revocations and ensure that the vehicle 12 will no longer provide access to the other party device 10b.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the vehicle 12, device 10 any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. A method of sharing permission to access vehicles, the method comprising:
    prior to generating a sharing invitation for another party, registering an owner device with a vehicle by obtaining a vehicle identity certificate from the vehicle and providing an owner identity certificate to the vehicle;
    generating at an owner device, the sharing invitation for the other party to obtain a credential for the other party;
    generating a digital permission for the other party using the credential associated with the sharing invitation;
    signing the digital permission using a private key associated with the owner device, the private key being associated with the owner identity certificate provided to the vehicle; and
    sending the digital permission to the other party to be used in accessing the vehicle.

2. The method of claim 1, further comprising:
    sending the sharing invitation to a key sharing server; and
    receiving from the key sharing server a digital an other party identity certificate as the credential for the other party;
    wherein the digital permission is sent to the key sharing server to be forwarded to a device of the other party.

3. The method of claim 1, wherein the digital permission is sent to the other party device using a short range communication channel between the devices.

4. The method of claim 1, further comprising enabling restrictions to be set on the owner device, and including the restrictions in the digital permission sent to the other party.

5. The method of claim 4, wherein the digital permission contains information limiting the other party's access to a particular time frame or location, or also indicating one or more limitations on the other party, the limitations associated with one or more parameters.

6. The method of claim 5, wherein the limitation parameter corresponds to a timeframe or location, or in the case of a vehicle, speed or power, or some other controllable parameter associated with the system which is available beyond an access point of the vehicle.

7. The method of claim 5, wherein a limiting parameter is that the digital permission is required to be freshly signed by an access point of the vehicle periodically with a period determined by the owner.

8. The method of claim 1, further comprising receiving from a vehicle, a cryptographic challenge.

9. The method of claim 8, further comprising using the owner's cryptographic private key to complete the challenge, and sending the response to the vehicle.

10. The method of claim 9, further comprising encrypting the response to the vehicle.

11. The method of claim 8, wherein the vehicle has generated a nonce to be signed by the owner device, to inhibit replay attacks.

12. The method of claim 1, wherein the communication to the owner is encrypted to the owner.

13. A communication system for an owner device to enable the owner device to share permission to access vehicles, wherein the communication system stores a private key associated with the owner device, the communication system comprising a processor and memory, the memory storing computer executable instructions for:
 prior to generating a sharing invitation for another party, registering an owner device with a vehicle by obtaining a vehicle identity certificate from the vehicle and providing an owner identity certificate to the vehicle;
 generating at an owner device, the sharing invitation for the other party to obtain a credential for the other party;
 generating a digital permission for the other party using the credential associated with the sharing invitation;
 signing the digital permission using a private key associated with the owner device, the private key being associated with the owner identity certificate provided to the vehicle; and
 sending the digital permission to the other party to be used in accessing the vehicle.

14. The system of claim 13, wherein the owner device receives from the vehicle, a cryptographic challenge.

15. The system of claim 14, wherein the owner device uses the owner's cryptographic private key to complete the challenge, and the owner device sends the response to the vehicle.

16. The system of claim 15, wherein the communication to the vehicle is encrypted to the vehicle.

17. The system of claim 14, wherein the vehicle generates a nonce to be signed by the owner device, to inhibit replay attacks.

18. The system of claim 13, wherein the communication to the owner is encrypted to the owner.

19. The communication system of claim 13 further comprising:
 an access point; and
 the vehicle;
 wherein the vehicle and the owner device have a registration code, the owner device has a public and private key pair associated with a user, and the access point and vehicle each have an identity certificate and associated private keys;
 wherein the access point issues the identity certificate to the owner device associated with the users public and private keys, and the identity certificate of the access point is known and trusted by the vehicle;
 wherein the access point is configured to sign a message granting ownership of the vehicle to the user, the identity of the user indicating the owner identity certificate, and the vehicle conditionally accepts an ownership registration request of the user.

20. The system of claim 19, wherein the access point issues the vehicle identity certificate to establish the user's identity using a cryptographic key pair generated by the owner device.

21. The system of claim 20, wherein the vehicle determines that the owner device, whose public key is indicated by the permission, is in possession of the private key associated with the public key.

22. The system of claim 21, wherein possession of the private key is performed by having the owner device sign a particular challenge message.

23. The system of claim 20, wherein the communication to the owner device is encrypted to the user device.

24. The system of claim 20, wherein the communication to the vehicle is encrypted to the vehicle.

25. The system of claim 19, wherein the user issues a registration request to the vehicle containing the owner identity certificate and a cryptographically verifiable representation of the registration code.

26. The system of claim 19, wherein the vehicle validates both the signature of the access point and the cryptographically verifiable representation of the registration code on the message granting ownership to the user.

27. The system of claim 26, wherein the vehicle produces a nonce to be signed by the owner device, to inhibit replay attacks.

28. The system of claim 19, wherein the vehicle produces a signed confirmation of ownership containing the owner identity certificate of the new owner, which is issued to the new owner.

29. The system of claim 28, wherein the confirmation of ownership is passed by the owner to the access point.

30. The system of claim 13, further comprising instructions for:
 sending the sharing invitation to a key sharing server; and
 receiving from the key sharing server an other party identity certificate as the credential for the other party;
 wherein the digital permission is sent to the key sharing server to be forwarded to a device of the other party.

31. The system of claim 13, wherein the digital permission is sent to the other party device using a short range communication channel between the devices.

32. The system of claim 13, further comprising instructions for enabling restrictions to be set on the owner device, and including the restrictions in the digital permission sent to the other party.

* * * * *